United States Patent [19]

Ukrainsky et al.

[11] Patent Number: 4,773,735
[45] Date of Patent: Sep. 27, 1988

[54] FAST WARM-UP HEATER FOR LIQUID CRYSTAL DISPLAY

[75] Inventors: Orest J. Ukrainsky, Livingston; Alfred L. Levine, Kinnelon, both of N.J.

[73] Assignee: Allied-Signal Inc., Morris Township, Morris County, N.J.

[21] Appl. No.: 892,628

[22] Filed: Aug. 4, 1986

[51] Int. Cl.[4] ............................................. G02F 1/13
[52] U.S. Cl. ............................ 350/331 T; 350/336; 350/351
[58] Field of Search ............... 350/331 T, 336, 351; 357/28; 372/34, 36; 250/238

[56] References Cited

U.S. PATENT DOCUMENTS

| | | | |
|---|---|---|---|
| 3,017,522 | 1/1962 | Lubcke | 357/87 |
| 3,637,291 | 1/1972 | Kessler et al. | 350/351 |
| 4,238,759 | 12/1980 | Hunsperger | 372/36 |
| 4,689,659 | 8/1987 | Watanabe | 357/28 |

FOREIGN PATENT DOCUMENTS

| | | | |
|---|---|---|---|
| 0769318 | 10/1967 | Canada | 357/87 |
| 0112676 | 6/1984 | Japan | 372/36 |
| 0200481 | 11/1984 | Japan | 372/34 |
| 0197186 | 11/1984 | Japan | 372/36 |
| 0953339 | 3/1964 | United Kingdom | 357/87 |

Primary Examiner—John S. Heyman
Assistant Examiner—Trong Quang Phan
Attorney, Agent, or Firm—Howard G. Massung

[57] ABSTRACT

A solid state device such as a liquid crystal display (LCD 11) is provided with fast warm up characteristics by using an internal heater (31). The internal heater (31) preferably is located on a backplane, (13) and is used during warmup to supplement a conventional heater (41). The external heater (41) permits the LCD heater system to operate continuously at a selected temperature and not cause deterioration of the LCD (11). The internal heater (31) is electrically isolated from the device's backplane electrodes (17), for example, by the use of a thin oxide layer (33) between the internal heater (31) and the backplane electrodes (17).

13 Claims, 2 Drawing Sheets

FAST WARM-UP HEATER FOR LIQUID CRYSTAL DISPLAY

FIELD OF THE INVENTION

This invention relates to circuitry for increasing thermal operating stability of solid state devices. More specifically, the invention relates to a circuit for heating solid state arrays such as nematic liquid crystal (LCD) displays so that such arrays can perform in an acceptable manner.

BACKGROUND OF THE INVENTION

Solid state components such as nematic liquid crystal (LCD) displays are often temperature-dependent in their normal operating characteristics. For example, an LCD display relies on the behavior characteristics of twisted nematic crystalline substances when these nematic crystalline substances are exposed to driving voltages. In response to such exposure to driving voltages, the nematic crystals tend to align themselves so as to provide a desired reflectivity of light. When such substances are arrayed in a pattern, different portions of the substances can be provided with different driving voltages, thereby creating a pattern. Because of the different characteristics of these substances at different temperatures, their performance becomes temperature sensitive.

In order to avoid such temperature sensitivity, heating circuits have been provided for such diplays. Prior art liquid crystal displays are provided with a backplane glass which is used as a supporting substrate for the liquid crystal display. In order to allow such displays to operate at low temperatures, a resistive layer of indium tin oxide (ITO) was placed on the back surface of the backplane glass. The backplane glass provided insulation between the ITO heater element and the liquid crystal display. Typically, the backplane glass was approximately 0.75 mm thick. This provided ample electrical insolation between the ITO heater and the LCD but also resulted in an extensive warm-up time. When tested at minus 54° C., the LCD display required approximately 30 seconds warm-up time.

Full operation of a heating element inside an LCD display on the inside surface of the backplane, would cause deterioration of the liquid crystal substance. Therefore prior art heated LCDs had relied on external heaters, and the extended warm-up time.

This extended warm-up time was considered to be inadequate for some applications, such as for certain instrumentation on aircraft. It is therefore desired to provide a quicker warm-up time for the LCD. It is further desired that such a system for providing a quick warm-up time for an LCD not cause aberations in the normal performance of the LCD.

SUMMARY OF THE INVENTION

In accordance with the present invention, a solid state device such as a liquid crystal display (LCD) is provided with a heating arrangement in association with a backplane mounting substrate for the LCD. On an inside surface of the backplane, between the backplane and the LCD, an internal heater is provided, using a resistant material. The internal heater is coated with an insulating layer and backplane electrodes for the LCD are juxtaposed to the insulating layer, so that the insulating layer is between the internal heater and the backplane electrodes and nematic liquid crystal substance. On an external side of the backplane, a second heater is juxtaposed. The internal heater is used to provide LCD response, while continuous heating is applied through the external heater in the manner of conventionally heated liquid crystal displays.

In accordance with an alternate embodiment of the invention, the internal heater is not provided with an insulating layer and the internal heater is used in a pulsed-on mode.

Advantages include quick response time, along with the display stability which is obtained from conventional external heating of the LCD.

DETAILED DESCRIPTION OF THE PREFERRED EMBODIMENTS

Figure 1:
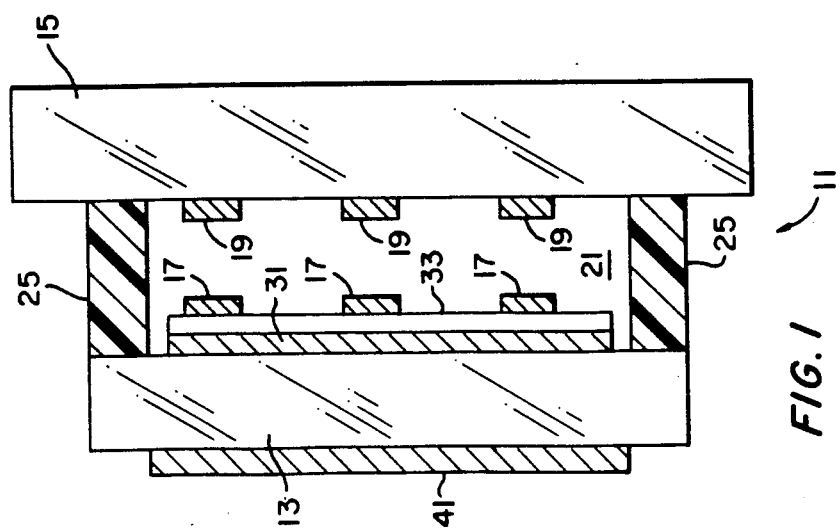
FIG. 1 shows a cross-sectional view of a preferred embodiment of the invention.

Referring to FIG. 1, a typical liquid crystal display (LCD) 11 includes a backplane 13 and a cover glass 15. Between the backplane 13 and cover glass 15 are two arrays of electrodes 17, 19 and liquid crystal substance 21.

The liquid crystal substance typically is an organic compound in a transition state between solid and liquid forms. Liquid crystals usually occur as vicious, jelly-like materials that resemble liquids in certain respects (viscosity) and crystals in other properties (light scattering and reflection). The various esters of cholesterol are the best-known examples. They can align with dichroic dye molecules in a thin-layer cell to produce color changes in transmitted light. Of particular interest with electronic LCD displays are nematic liquid crystals, which react to biasing voltages applied across a layer of the crystals to darken as a result of the voltage disrupting the orderly arrangement of the crystal molecules. The darkening of the liquid crystal is enough to form visible characters in a pattern corresponding to a pattern of the electrodes 17, 19.

The backplane 13 is typically made of an insulator such as glass. In prior art applications (not shown), backplane electrodes are coated or otherwise deposited onto the backplane. The cover glass 15 is also an insulator and the segment electrodes 19 are coated threon. The liquid crystal substance 21 is contained between the backplane and the cover glass by seals 25.

The electrodes 17, 19 are made of conductive or semiconductive materials such as indium tin oxide (ITO). Very little current is caused to flow through the electrodes 17, 19, so that the relative resistivity of thin layers of ITO electrode material do not adversely affect performance of the LCD device 11.

The inventive LCD 11 is provided with a heater element 31 which is used to bring the liquid crystal substance 21 to a preferred operating temperature. The heater element 31 is coated or otherwise placed onto the backplane 13 on the inside surface of the backplane 13. It is also possible to place the heater element 31 on any other inside surface of the LCD 11, much as electrodes 19 are deposited onto the inside surface of the glass cover 15.

The heater element 31 is preferably made of indium oxide, tin oxide or indium tin oxide (ITO), although other resistive materials may be used. In order to allow the backplane electrodes 17 to operate independently of current applied to the heater element 31, and insulating layer 33 is deposited onto the heater element 31, and backplane electrodes 17 are deposited onto the insulating layer 33. The insulating layer may be made of any convenient insulating material such as silicon dioxide, and allows the backplane electrodes to be supported by the backplane 13 through the heater element 31 and the insulating layer 33. The insulating layer 33 further prevents the biasing voltages applied to the heater element 31 from biasing the liquid crystal material 21, thereby preventing the liquid crystal material 21 from reacting to the biasing of the heater element 31. The insulating layer 33 also permits the backplane electrodes 17 to operate in a manner consistent with the backplane electrodes 17 being insulated from conductor materials.

An external heater 41 is placed on the external surface of the backplane 13. The external heater is similar to the external heaters used in prior art heated LCD designs and permits continued operation of the LCD in a manner similar to such prior art heated LCDs.

Figure 2:
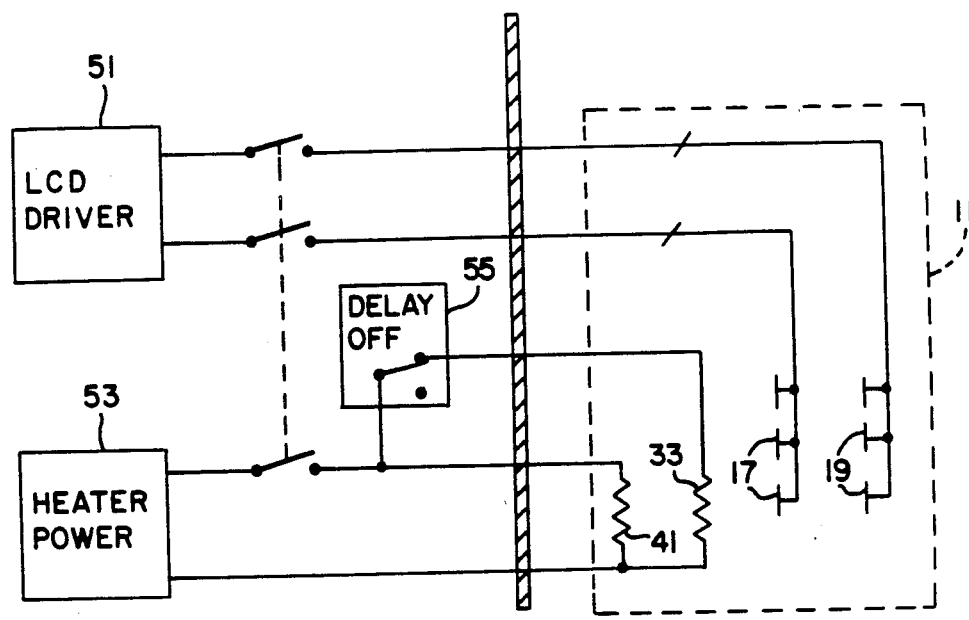
FIG. 2 shows a circuit for driving the embodiment of FIG. 1.

The operation of the two heater elements 33, 41 is best explained with reference to FIG. 2. FIG. 2 schematically shows the circuitry of the embodiment of FIG. 1 (and applies equally to the embodiment of FIG. 4).

In FIG. 2, the LCD 11 is provided with display signals by an LCD driver 51 which provides biasing voltages to the electrodes 17, 19. When the display 1 is activated a heater power supply 53 connects to the heater elements 33, 41, activating the heater elements 33, 41. Since the internal heater element 33 is only used for a quick initial warm-up, current to the internal heater element is interupted after a short time period by a delay circuit 55. By the time the current is interupted, the external heater element 41 is providing sufficient heat to permit satisfactory performance of the display 11, and current is applied to the external heating element 41 in order to maintain a desired temperature of the LCD display 11. Operation of the external heater element 41 would not provide the desired warm-up characteristics of the display 11 because of the time it takes for heat generated by the external heater element 41 to be conducted through the backplane 13. Since the internal heating element 33 avoids such time delays, with only the insulating layer 33 slowing heat transfer from that heater element 31 to the liquid crystal substance 21, there is no need for a rapid transfer through the backplane 13. Additionaly, since the internal heater element 31 is providing heat to the backlane 13 as well as to the liquid substance 21, the backplane 13 is heated rapidly. Once the backplane 13 is heated, it is only necessary that the backplane 13 transfer enough heat to maintain the liquid crystal substance 21 at a desired temperature.

Figure 3:
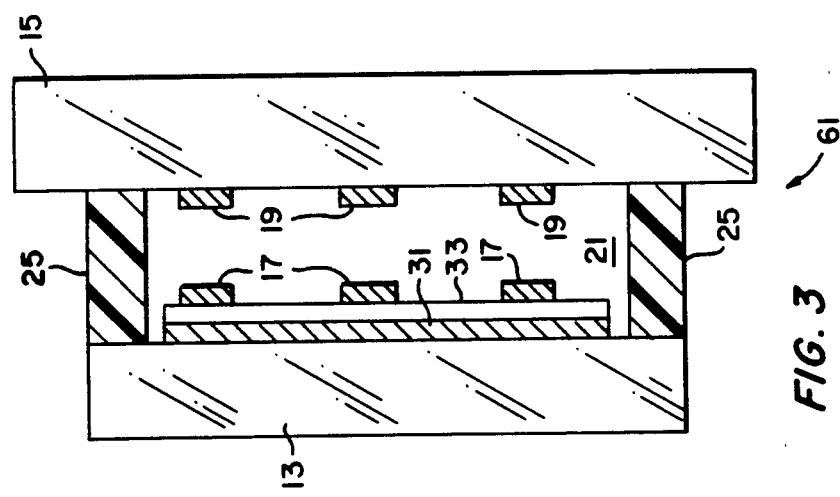
FIG. 3 shows an alternate embodiment of the invention in cross-section.

Referring to FIG. 3, it may be possible to provide a modified display 61, in which an internal heater element 31 is provided and no external heater element is required. In that arrangement, the heater element 31 must be maintained at a relatively low power level after initial warm-up in order to avoid causing the liquid crystal substance 21 to deteriorate.

EXAMPLE

It was desired that improved performance be obtained from LCD displays in certain aircraft applications. The testing criteria had been established at $-54°$ C. Using conventional backplane heaters and a backplane having a thickness of 0.75 mm, warm-up was approximately 30 seconds before good performance was obtained from the display.

A display was tested, using the configuration of FIG. 1, except the heaters were located on both the inside surface of the cover glass, as well as the inside surface of the backplane. The experiment was designed to test the "on" response time of a twisted-nematic LCD being driven with 12 V DC at 30 HZ.

The LCD's segments were connected together to be driven by the same "on" signal and a common backplane signal. The common signal allowed for observation of possible different LCD response over the entire LCD area. This would show non-uniformity in the heating process. The LCD had its electrodes layered on top of the heater isolated with silicon dioxide. The display featured black characters on a clear background.

The LCD was situated in a thermal chamber with the display facing the viewing window. All connections to the LCD were made through an access hole in the side of the chamber. The internal temperature of the chamber was lowered to $-55°$ C., and the LCD was stabilized at this temperature for half an hour. After stabilization the LCD heater circuit and segment driver signals were switched on to heat and drive the LCD.

When switching the heater and segment driver on, the segments turned black before the timer counted one second 9 out of 12 times. The other three times the segments turned partially black before one second and fully black after 1.25 seconds.

Figure 4:
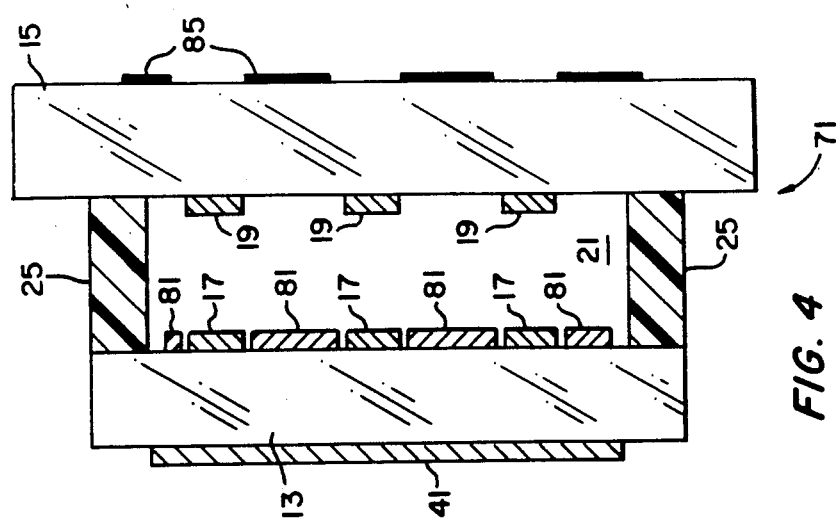
FIG. 4 shows a cross-sectional view of an alternate embodiment, in which no insulating layer is used between backplane electrodes and an internal heater.

In order to cause the display to become fully operational in a time period of less than 1 second, it was concluded that a display 71 should be constructed as shown in FIG. 4. In that configuration, an internal heater element 81 should be in direct contact with the liquid crystal substance 21 and, as in the configuration of FIG. 1, an external heater element 41 is provided. In that configuration, the internal heater element 81 would be pulsed on and the display 71 would be considered inoperative during the time in which the internal heater 81 is pulsed on. As in the configuration of FIG. 1, the external heater 41 would remain on as long as necessary to maintain the display 71 in a proper operating state. It is anticipated that the internal heater element 81 may have to be pulsed on several times during the first minute of operation. If the pulses are sufficiently short, the display 71 would only be momentarily blanked, thus providing a performance which is at least adequate during the initial operation of the display 71. During the time periods in which the internal heater element 81 is pulsed on, the display 71 would effectively be blanked by showing the effects of the biasing inherent from energizing the internal heater element 81. If the time periods of the internal heater element 81 being pulsed on are sufficiently short this pulsing on should not significantly diminish the utility of display 71 during the warm-up period. In order to further enhance the utility of the display 71 when the internal heater element 81 is being used, it is possible to mask the non-segment areas of the display 71 in order that those parts of the display 71 which are directly over the electrodes 17, 19 may be seen. The masked areas 85 are shown in FIG. 4 on an outer surface of the cover glass 15.

An advantage of not using an insulating layer (33, FIG. 1) is that the heater 81 can be deposited between the backplane electrodes 17 in a single deposition step.

It is clear from the above description that there are numerous variations on the inventive concepts. Therefore, the invention should be read only as limited by the claims.

We claim:

1. Solid state device in which active portions of the solid state device are supported by an insulating substrate, and in which the device is temperature sensitive in its operating characteristics, characterized by:
   (a) an internal heating element interposed between the active elements of the device and the insulating substrate;
   (b) a further insulating layer interposed between the internal heating element and the active elements of the device, so that the internal heating element is at least partially separated from the active elements by the insulating layer, with the insulating substrate providing physical support for the internal heating element and at least some of the active elements of the solid state device; and
   (c) an external heating element mounted to the insulating substrate, so that the external heating element is separated from the active elements by the insulating substrate.

2. Solid state device as described in claim 1, further characterized by:
   (a) means to provide a first power level to the internal heater at an initial time period and to reduce the power level to the internal heater subsequent to the internal time period.
   (b) an external heating element mounted to the insulating substrate on an external side of insulating substrate, so that the external heating element is separated from the active elements by the insulating substrate.

3. Solid state device in which active portions of the solid state device are supported by an insulating substrate, and in which the device is temperature sensitive in its operating characteristics, characterized by:
   (a) an internal heating element interposed between the active elements of the device and the insulating substrate; and
   (b) an external heating element mounted to the insulated substrate on an external side of the insulating substrate, so that the external heating element is separated from the active elements by the insulating substrate.

4. Solid state device as claimed in claim 3 characterized by:
   means to provide a first power level to the internal heating element at an initial time period and to reduce the power level to the internal heating element subsequent to the initial time period.

5. Solid state device as described in claim 3, further characterized by:
   means to provide a first power level to the internal heating element at an initial time period and to reduce the power level to the internal heater subsequent to the initial time period.

6. Liquid crystal display in which liquid crystal substance is contained between a front member and a back member and in which an array of electrodes is used to change the optical state of the liquid crystal substance in order to provide a plurality of display segments, and in which the liquid crystal display is provided with a heater for establishing the liquid display substance to a preferred operating temperature range, characterized by:
   (a) an internal heating element interposed between the arrays of electrodes and at least one of the front and back members;
   (b) an insulating layer, distinct from the back and front members, interposed between the arrays of electrodes and he heating element;
   (c) at least one of the arrays of electrodes juxtaposed to the insulating layer, with the internal heating elements being supported by the said one of the members, and in turn supporting the insulating layer, which in turn supports said one of the array of the electrodes, the insulating layer electrically separating the internal heating element from the electrodes;
   (d) said one of the members being a backplane for the liquid display device, so that the internal heating element is juxtaposed to the backplane of the liquid crystal device; and,
   (e) a second heating element, external to the members, so that heat generated by the second heating element must be transferred through the member to which it is attached in order to provide heat to the liquid crystal display substance.

7. Liquid crystal display as described in claim 6, further characterized by:
   means to provide a first power level to the internal heating element at an initial time period and to reduce the power level to the internal heating element subsequent to the initial time period.

8. Liquid crystal display as described in claim 6, further characterized by:
   means to provide a first power level to the internal heating element subsequent to the initial time period.

9. Liquid crystal display as described in claim 6, further characterized by:
   means to provide a first power level to the internal heating element at an initial time period and to reduce the power level to the internal heater subsequent to the initial time period.

10. Liquid crystal display in which liquid crystal substance is contained between a front member and a back member and in which an array of electrodes is used to change the optical state of the liquid crystal substance in order to provide a plurality of display segments, and in which the liquid crystal display is provided with a heater for establishing the liquid display substance to a preferred operating temperature range, characterized by:
    (a) an internal heating element interspaced between a plurality of said electrodes;
    (b) a second heating element, external to the members, so that heat generated by the second heating element must be transferred through the member in which it is attached in order to provide heat to the liquid crystal substance.

11. Liquid crystal display as described in claim 10, further characterized by:
    masking means to obscure some of a biasing effect on the liquid crystal substance which may be caused by the interspaced heating element.

12. Liquid crystal display as described in claim 11, further characterized by:

means to provide a first power level to the internal heating element at an initial time period and to reduce the power level to the internal heating element subsequent to the initial time period.

13. Liquid crystal display as described in claim 10, further characterized by:

means to provide a first power level to the internal heating element at an initial time period and to reduce the power level to the internal heating element subsequent to the initial time period.

* * * * *